Dec. 8, 1925.  
F. L. FURGAL  
1,565,085  
HARNESS OR DROP BOX CHAIN  
Filed Feb. 9, 1925
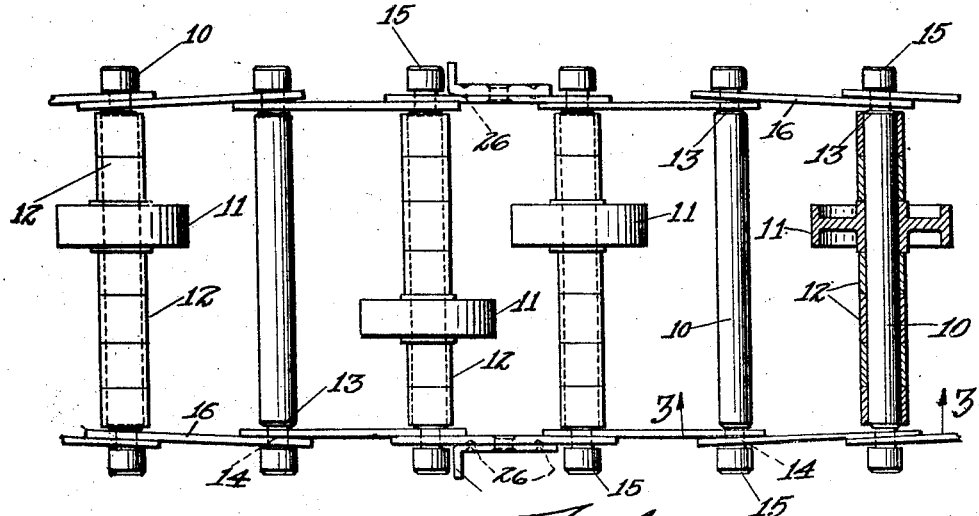
Fig. 1.
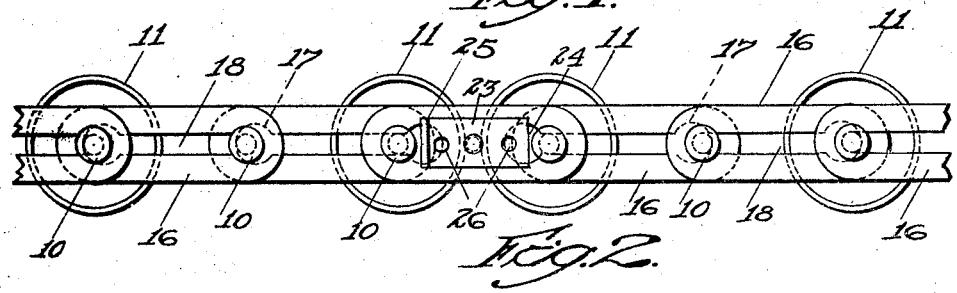
Fig. 2.
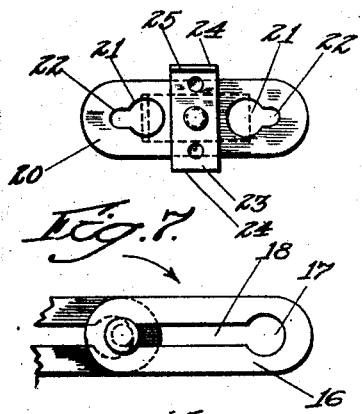
Fig. 7.
Fig. 6.
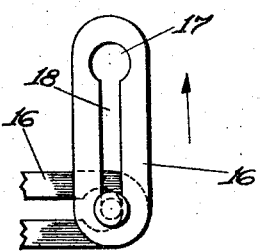
Fig. 5.
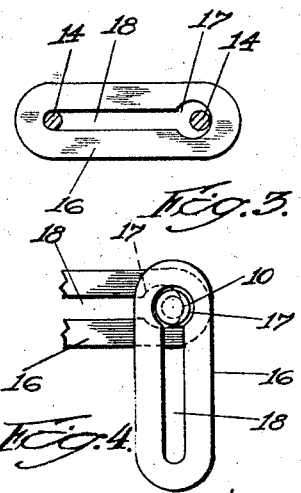
Fig. 3.
Fig. 4.
Inventor:  
Frank L. Furgal  
By attorneys.

Patented Dec. 8, 1925.

1,565,085

UNITED STATES PATENT OFFICE.

FRANK L. FURGAL, OF WARREN, MASSACHUSETTS.

HARNESS OR DROP-BOX CHAIN.

Application filed February 9, 1925. Serial No. 7,733.

*To all whom it may concern:*

Be it known that I, FRANK L. FURGAL, a citizen of the United States, residing at Warren, in the county of Worcester and State of Massachusetts, have invented a new and useful Harness or Drop-Box Chain, of which the following is a specification.

The principal object of the invention is to provide a form of link for a loom chain of the character described which can be assembled much more rapidly than has been the case heretofore and which will remain in place without danger of becoming dislodged after it is once connected with the pins of the chains. The invention also involves an end connection for connecting the two ends after the chain has been assembled that far. Other objects and advantages of the invention will appear hereinafter. Parts of the invention are capable of general application to chains of other types.

Reference is to be had to the accompanying drawings in which

Fig. 1 is a plan of a harness or drop box chain constructed in accordance with this invention with one of the sets of balls and spacers in section;

Fig. 2 is an edge elevation of the same;

Fig. 3 is a sectional view on the line 3—3 of Fig. 1;

Fig. 4 is a side view of a part of the chain showing one link in place and the second link in the initial position which it occupies in putting it into place;

Fig. 5 is a similar view showing the first motion necessary to bring the new link into proper position;

Fig. 6 is a similar view showing the final position of the new link; and

Fig. 7 is a view of the end connecting link as shown in Fig. 2 but with the locking member turned to permit insertion or removal of the pins.

The invention is not intended to change the operative parts of a harness chain but I employ the pins 10, balls 11 and spacers 12 arranged as usual except that the pins are provided with chamfered ends 13 on the inner sides of the necks 14 preferably to facilitate the assembly of the parts. Also the extreme ends of the pins are chamfered at 15 to make the insertion into the eyes of the links more easy.

The chains are made up of links 16 each having a keyhole slot comprising a circular end 17 located at one end of the link and substantially concentric with that end which is shown semi-circular. The slot has a narrower straight portion extending from this circular perforation to a point at the center of the other end of the link concentric with that end. This narrow slot extends substantially throughout the whole length of the link except for the end portions which bound it. All the links are made the same except the locking link which will be mentioned hereinafter.

In assembling the parts, a pin 10 is provided with the balls 11 in the necessary places and these are spaced apart by the spacers 12 as is well understood in this art. Assuming that several links have been assembled with the pins, it will be understood that one of the previously assembled links shown in the horizontal position in Figs. 4, 5 and 6 is located with its circular perforation 17 in the position indicated in Fig. 3 with respect to the necks of two pins. These two pins are at the extremities of the slot 18 and the one that is now being put on is as far away from the other as it can go and located in the circular part 17 of the key slot.

This is the same position as indicated in Fig. 4 except that now a new link 16 is put on. These circular perforations are large enough to go over the end of the pin 10 and it is put on in that way on the outside of the horizontal link shown. This new link is put on in either vertical position or at some angle to the horizontal. It will be seen at this point that the circular openings 17 of both links are located on the same pin 10. This new link is the outer one and it is pushed longitudinally to the position indicated in Fig. 1 or some similar position so that the narrow part of the slot will come under the head of the pin and receive the neck of the pin through it which fits it loosely. Now the horizontal link cannot be taken off in this direction and it cannot move back on account of the ball or spacer just back of it. The final step in assembling this link is to turn it about the pin so it comes into the position shown in Fig. 6. Then the next pin is put through and the next link added in the same way.

I have found in practice that this is a very expeditious and simple method of assembling these chains. Even without practice it takes less time than the ordinary methods and with practice skill is developed which permits of the assembling of the whole chain with great rapidity. After the links are assembled, they cannot come off on account of the relative positions just above described. Each link is located slightly at an angle except the last pair on each end. But that makes no difference in the operation of the chain. The necks are made long enough to hold the links in this angular position.

The two ends of the chain are connected together by a pair of locking links 20, one for each side. Each locking link is provided with two keyhole slots 21 located symmetrically in their opposite ends. Each of these slots has a circular portion of the same size as the circular opening 17 and a slot 22 extending therefrom forming a longitudinal portion of less width terminating like the slot 18 described in a semi-circle concentric with the semi-circular end of the link. The distance apart of the ends of these semi-circles is the same as two centers of the two pins shown in Fig. 3 which is a little greater than the distance between the two centers of the two ends of the slot in that figure. The relationship between the links 16 and 20 is such that the distance between the two centers of the semi-circles at the ends of the two slots in the link 20 is equal to the distance between the corresponding point 16 at one end and the pin 20 located in the enlargement 17 at the other. This is the pitch of the chain.

At the center of the link 20 a locking member 23 is pivoted by means of a headed rivet or the like. This locking member is simply provided with two end edges 24 which, when in locking position shown in Figs. 1 and 2, prevent the dislodgment of the pins from their respective slots. At one end it is provided with an integral lip 25 constituting a handle by which it can be turned with a pair of pinchers or the like.

Another feature of this locking member is the provision of two projections 26 on the inner surface thereof at equal distances from the center and adapted to enter the two slots 21 when it is turned to locking position as shown in Fig. 2. On account of the fact that this locking member has a little resiliency and the fact that these projections are simply formed by prick punches or the like so as to have conical sides, it is possible to turn this locking member on its pivot by means of a pair of pinchers into the position shown in Fig. 7 for assembly and disassembly. It is also possible to turn it back into the position shown in Fig. 2 to lock the parts in position respectively. One is shown on each of the chains which go to make up the whole pattern chain.

It will be seen that two adjacent pins can be inserted in the locking link when it is in the position shown in Fig. 7 until the necks come into the plane of the link. Then they can be moved outwardly in opposite directions and they will come into a position in which they are at a distance apart equal to the pitch of the chain with the necks in the narrow slots 22. Then the locking member can be turned to the position shown in Fig. 2 in which its ends overlap the large portion of the two keyhole slots to prevent the disengagement of the pins. In this place the projections 26 just come into the nearest edges of the two keyhole slots and hold it against accidentally turning.

Although I have illustrated and described only a single form of the invention, I am aware of the fact that modifications can be made therein by any person skilled in the art without departing from the scope of the invention as expressed in the claims.

Therefore I do not wish to be limited to the details herein disclosed, but what I do claim is:—

1. As an article of manufacture, a chain comprising pins, balls and spacers assembled together, each pin having a reduced neck near the end, and links for connecting said pin at the neck, each link having a longitudinal slot extending substantially throughout the length of the link and constituting its only means for receiving the pins and provided with an enlarged circular portion at one end of the slot of sufficient size to receive the largest diameter of the pin, said links being arranged along the chain with the enlarged portions of the slots located at the same end.

2. As an article of manufacture, a chain comprising a series of pins having a reduced neck at the end, a series of links each extending from one neck to the next one, each link having a longitudinal slot extending substantially throughout the length of the link of a width sufficient to receive the neck of a pin, and each link being provided with an enlargement at the end of the slot of a shape and size to receive the end of the pin beyond the neck and so located that when the parts are assembled the necks of two adjacent pins will lie at the extreme ends of a single keyhole slot.

3. In a harness chain for a loom, the combination with a series of pins having reduced necks at each end, of a link connecting each two adjacent pins, each link having a long slot extending substantially throughout its length and of a width to receive one of the necks freely and having an enlarged circular opening at its extreme end for receiving therein the end of the pin so that it can be put over the end and engage the neck thereof, said link being located at a slight angle to the pins and having the next link at one end located on one side of it and the next link on the other end located on the other side of it.

4. In a loom harness chain, the combination with a series of pins having reduced necks near each end, of series of links each having a keyhole shaped slot extending substantially throughout the length thereof, each link being so located that it will bear on the outside of the next link at one end and receive the neck of that pin in the narrow part of the slot at the extreme end and will be located at the inner side of the next link at the other end and receive the neck of another pin in its enlargement at that end and will be prevented from disengagement by the next link which is located in the narrow part of its slot at that end.

5. As an article of manufacture, a link for a chain consisting of a flat piece of metal having a keyhole slot therein having a circular enlargement at one end and a longitudinal opening of uniform width extending therefrom substantially to the other end, the entire slot extending all the way from one end of the link to the other and receiving a pin at each end at the same time.

6. As an article of manufacture, a locking link for a chain comprising a flat link having two keyhole slots one at each end having the enlargements of said slots in circular form and smaller portions thereof extending therefrom outwardly toward the ends of the links and having the centers of the ends of each smaller portion a distance apart equal to the pitch of the chain, whereby the pins of the chain can be introduced through the enlargements and then moved outwardly.

7. As an article of manufacture, a locking link for a chain comprising a link having a keyhole slot at the end having an enlargement in circular form and the smaller portion thereof extending therefrom outwardly toward the end of the link, and a locking member pivoted on the link and having its end in such position that when turned to a longitudinal position it will overlap the enlargement of the keyhole slot so as to prevent the accidental removal of a pin therein.

8. As an article of manufacture, a locking link for a chain comprising a link having two keyhole slots one at each end having the smaller portions thereof extending outwardly toward the ends of the links and having the centers of the ends of each smaller portion a distance apart equal to the pitch of the chain, and a locking member pivoted on the link at the center and having its ends in such position that when turned to a longitudinal position they will overlap the enlargements of the two keyhole slots so as to prevent the removal of pins therein, said locking member having a pair of projections on its inner surface in such position as to be adapted to just engage in the inner ends of the two slots when located longitudinally and having an outer projection at one end for use in turning it.

9. In a loom harness chain, the combination with the pins, balls and spacers, of a series of links for connecting the pins, each having a longitudinal slot with a circular enlargement at its end and having the distance between the center of the smaller end of the longitudinal slot and the center of the smallest part of one of said pins held at the extreme end of the enlargement will be equal to the pitch of the chain, and a locking link for the chain comprising a pair of keyhole slots each having a circular enlargement of the same size and a short longitudinal extension outwardly therefrom to such a point that the distances between the centers of the ends of the smaller parts of said slots of the locking link are also equal to the pitch of the chain.

In testimony whereof I have hereunto affixed my signature.

FRANK L. FURGAL.